(12) United States Patent
Richards

(10) Patent No.: US 9,416,280 B2
(45) Date of Patent: Aug. 16, 2016

(54) STYRENE-MALEIC ANHYDRIDE BASED DISPERSANT IN A COATING OR INK

(75) Inventor: Stuart N. Richards, Frodsham (GB)

(73) Assignee: Lubrizol Limited, Derby, Derbyshire (GB)

( * ) Notice: Subject to any disclaimer, the term of this patent is extended or adjusted under 35 U.S.C. 154(b) by 679 days.

(21) Appl. No.: 12/594,248

(22) PCT Filed: Apr. 4, 2008

(86) PCT No.: PCT/EP2008/054090
§ 371 (c)(1),
(2), (4) Date: Oct. 1, 2009

(87) PCT Pub. No.: WO2008/122606
PCT Pub. Date: Oct. 16, 2008

(65) Prior Publication Data
US 2010/0130678 A1 May 27, 2010

Related U.S. Application Data

(60) Provisional application No. 60/909,955, filed on Apr. 4, 2007.

(51) Int. Cl.
| | | |
|---|---|---|
| *C08K 5/00* | (2006.01) | |
| *C08G 69/48* | (2006.01) | |
| *C09D 5/02* | (2006.01) | |
| *C08F 8/30* | (2006.01) | |
| *C08F 8/32* | (2006.01) | |
| *C09D 7/02* | (2006.01) | |
| *C09D 11/03* | (2014.01) | |
| *C09D 11/101* | (2014.01) | |
| *C09D 11/326* | (2014.01) | |
| *C08F 212/08* | (2006.01) | |

(52) U.S. Cl.
CPC . *C09D 5/027* (2013.01); *C08F 8/30* (2013.01); *C08F 8/32* (2013.01); *C09D 7/02* (2013.01); *C09D 11/03* (2013.01); *C09D 11/101* (2013.01); *C09D 11/326* (2013.01); *C08F 212/08* (2013.01)

(58) Field of Classification Search
CPC ............ C08F 8/30; C08F 8/32; C08F 210/00; C08F 212/02; C08F 212/06; C08F 212/08; C08F 222/06; C09D 7/02; C09D 11/03; C09D 11/101; C09D 11/326; C09D 5/027
USPC ........................... 524/236, 606, 608; 525/451
See application file for complete search history.

(56) References Cited

U.S. PATENT DOCUMENTS

| | | | | |
|---|---|---|---|---|
| 3,365,399 A | * | 1/1968 | Verdol et al. | 508/235 |
| 3,415,745 A | * | 12/1968 | Isaacson et al. | 210/734 |
| 3,432,479 A | * | 3/1969 | Verdol et al. | 525/327.6 |
| 3,472,771 A | * | 10/1969 | Grimm et al. | 508/471 |
| 5,705,603 A | | 1/1998 | Krull et al. | |
| 6,225,395 B1 | * | 5/2001 | Nzudie et al. | 524/458 |
| 6,423,785 B1 | | 7/2002 | Esselborn et al. | |
| 2006/0231487 A1 | * | 10/2006 | Bartley et al. | 210/506 |
| 2007/0244216 A1 | * | 10/2007 | Stern | 523/122 |
| 2012/0264610 A1 | * | 10/2012 | Stern | 504/361 |

FOREIGN PATENT DOCUMENTS

| | | |
|---|---|---|
| WO | 03/074605 A1 | 9/2003 |
| WO | 2008/080579 A1 | 7/2008 |
| WO | 2008/080580 A2 | 7/2008 |
| WO | 2008/080581 A1 | 7/2008 |

* cited by examiner

*Primary Examiner* — Alexa Neckel
*Assistant Examiner* — Marie Reddick
(74) *Attorney, Agent, or Firm* — Samuel B. Laferty, Esq.; Teresan W. Gilbert, Esq.

(57) ABSTRACT

The invention relates to a composition containing a particulate solid, an organic or aqueous medium, and a copolymer containing less than 25 mol % of residues of monomers comprising a dicarboxylic acid, or anhydride thereof. The invention further relates to novel copolymers, and the use of the copolymers as a dispersant.

12 Claims, No Drawings

US 9,416,280 B2

STYRENE-MALEIC ANHYDRIDE BASED DISPERSANT IN A COATING OR INK

CROSS REFERENCE TO RELATED APPLICATION

This application claims priority from PCT application Ser. No. PCT/EP2008/054090 filed on Apr. 4, 2008, which claims the benefit of U.S. Provisional Application No. 60/909,955 filed on Apr. 4, 2007.

FIELD OF INVENTION

The invention relates to a composition containing a particulate solid, an organic or aqueous medium, and a copolymer containing less than 25 mol % of residues of monomers comprising a dicarboxylic acid, or anhydride thereof. The invention further relates to novel copolymers, and the use of the copolymers as a dispersant.

BACKGROUND OF THE INVENTION

Many coating properties such as colour intensity, opacity and gloss depend upon the extent of aggregation or flocculation of pigment particles (or other particulate materials) within the coating. Colour is normally introduced into a coating formulation by addition of a pigment dispersion in solvent containing a high concentration of pigment. The pigment dispersion is generally produced by one of a variety of milling techniques to break up the aggregates of pigment particles and reduce the average particle size. Milling is often carried out in the presence of some polymeric material which is present to stabilize the dispersion and minimize flocculation of the dispersed particles.

It can often be advantageous to be able to use one colour concentrate for letdown into a variety of different binder systems. However, the polymeric material present in the colour concentrate can give rise to problems if it is not compatible with the coating binder. For example, when nitrocellulose is utilised as a pigment grinding medium in a polyamide binder system, there may be compatibility problems leading to reduced gloss and colour strength.

U.S. Pat. No. 6,406,143 discloses a graft copolymer of styrene-maleic anhydride reacted with a polyetheramine. The graft copolymer is described as suitable for use as an ink-jet dispersant.

U.S. Pat. Nos. 5,705,603, 5,391,632; and European Patent applications EP 324 547 A2, and EP 606 055 B1, all disclose a polyetheramine copolymer containing α,β-unsaturated dicarboxylic acids or anhydrides. The dicarboxylic acids or anhydrides groups are reacted such that they contain 20-80 mole percent of a mixture of (i) unreacted anhydrides, imides, amides, half-acid-amides. The imides and amides are derived from an alkyl amine containing 6 to 40 carbon atoms.

Japanese Patent publication JP 2006028252 A (published on Feb. 2, 2006, and assigned to Ajinomoto Co. Inc.) discloses an amino-group containing maleic acid copolymer useful as a dispersant. The copolymer contains a ratio of constituent (A) to constituent (B) of 1:3 to 3:1.

Therefore, there is a need for pigment dispersants which can generate stable colour concentrates and provide acceptable or improved coating properties when used in a range of different ink and coating binders such as nitrocellulose, polyamide and polyurethane.

SUMMARY OF THE INVENTION

In one embodiment, the invention provides a copolymer comprising a polymer derived from (a) monomer (A), and (b) monomer (B), a dicarboxylic acid or anhydride thereof, which contains less than 25 mol % of monomer (B) (based on the combined mole percent of (A) and (B)), wherein at least a portion of the anhydride or dicarboxylic acid groups derived from monomer (B) are subsequently reacted with at least one amine selected from the group consisting of:

(i) a compound containing at least one tertiary or heterocyclic amine site and at least one additional group capable of reacting with dicarboxylic acid, or anhydride functional groups, and (ii) a polyetheramine.

In one embodiment, the copolymer comprises groups derived from both (i) a compound containing at least one tertiary or heterocyclic amine site and at least one additional group capable of reacting with dicarboxylic acid, or anhydride functional groups, and (ii) a polyetheramine.

In one embodiment, the invention provides a composition comprising a particulate solid, an organic or aqueous medium and a copolymer as defined above.

In one embodiment, the invention provides a composition comprising a particulate solid, an organic or aqueous medium and a copolymer obtained/obtainable by reacting:

(1) (a) monomer (A) (such as vinyl aromatic monomer or an α-olefin), and (b) monomer (B), a dicarboxylic acid or anhydride thereof to form a copolymer, wherein the copolymer contains less than 25 mol % of monomer (B);

(2) reacting the copolymer of (1) with at least one amine selected from the group consisting of:

(i) a compound containing at least one tertiary or heterocyclic amine site and at least one additional group capable of reacting with dicarboxylic acid, or anhydride functional groups, and (ii) a polyetheramine.

In one embodiment, the invention provides for the use of the copolymer as defined above as a dispersant.

In one embodiment, the invention provides for the use of the copolymer as defined above as a dispersant in the composition disclosed herein.

DETAILED DESCRIPTION OF THE INVENTION

The present invention provides a composition as disclosed herein above.

The copolymer typically has a number average molecular weight of 1000 to 50,000, or 1500 to 20,000, or 2000 to 20,000.

The copolymer may contain monomer (B) units of less than 20 mol %, or 0.1 to 15 mol %.

The copolymer may contain monomer (A) units of more than 75 mol %, or 85 mol % to 99.9 mol %.

In one embodiment, monomer (A) includes an α-olefin, a vinyl aromatic monomer, or mixtures thereof.

In one embodiment, the copolymer is derived from an α-olefin and maleic anhydride (or maleic acid).

In one embodiment, the copolymer is derived from a vinyl aromatic monomer and maleic anhydride (or maleic acid).

The compound containing at least one tertiary or heterocyclic amine site typically reacts with up to 70%, or up to 50%, or up to 35% of monomer (B) groups of the copolymer. The minimum percentage of monomer (B) groups reacting with the compound containing at least one tertiary or heterocyclic amine site typically includes at least 5%, or at least 8%, or at least 10%, or at least 14% of monomer (B) groups of the copolymer.

The polyetheramine typically reacts with at least 10%, or at least 30%, or at least 50%, or at least 65% of monomer (B) groups of the copolymer. The maximum percentage of monomer (B) groups reacting with the polyetheramine is typically not more than 95%, or not more than 92%, or not more than 90%, or not more than 86%. In one embodiment, the percentage of monomer (B) groups reacting with the polyetheramine is in the range of 65% to 86%.

Optionally, a portion of monomer (B) further reacts with an alcohol and/or an amine other than (i) the compound containing at least one tertiary or heterocyclic amine, and (ii) the polyetheramine. The monomer (B) may react with another amine at 0% to 20%, or 0%, to 10%, or 0% to 5%. In one embodiment, monomer (B) is not further reacted with an alcohol and/or an amine other than (i) the compound containing at least one tertiary or heterocyclic amine.

In one embodiment, the copolymer contains a portion of monomer (B) is not reacted with an amine other than (i). The portion of monomer (B) that does not react with an amine other than (i) may be 0% to 20%, or 0%, to 10%, or 0% to 5%.

Monomer (A)

In one embodiment, monomer (A) is a vinyl aromatic monomer. Examples of a suitable vinyl aromatic monomer include styrene (also referred to as ethenylbenzene), substituted styrene or mixtures thereof. Examples of a suitable substituted styrene include α-methylstyrene, para-methylstyrene (also referred to as vinyl toluene), para-tert-butylstyrene, α-ethylstyrene or mixtures thereof. In one embodiment, the vinyl aromatic monomer is styrene.

In one embodiment, the α-olefin is derived from the formula $H_2C=CHR^1$, wherein $R^1$ is a hydrocarbyl group (for example an alkyl radical containing 1 to 18, or 1 to 10, or 1 to 6, or 1 to 3 carbon atoms). The hydrocarbyl group includes an alkyl radical that has a straight chain, a branched chain or mixtures thereof. Examples of a comonomer include propylene, 1-butene, 1-hexene, 1-octene, 4-methyl-1-pentene, 1-decene or mixtures thereof. In one embodiment, the comonomer includes 1-butene, propylene or mixtures thereof. Examples of the olefin copolymers include ethylene-propylene copolymers, ethylene-1-butene copolymers or mixtures thereof.

In one embodiment, the α-olefin includes a comonomer, wherein the comonomer contains a number of carbon atoms in ranges of 6 to 40, or 10 to 34, or 14 to 22. Examples of an α-olefin include 1-decene 1-undecene, 1-dodecene, 1-tridecene, 1-tetradecene, 1-pentadecene, 1-hexadecene, 1-heptadecene 1-octadecene, 1-nonadecene, 1-eicosene, 1-doeicosene, 2-tetracosene, 3-methyl-1-henicosene, 4-ethyl-2-tetracosene or mixtures thereof. Useful examples of an α-olefin include 1-pentadecene, 1-hexadecene, 1-heptadecene 1-octadecene, 1-nonadecene or mixtures thereof. The α-olefin is often commercially available as mixtures especially as $C_{16}$-$C_{18}$.

Monomer (B)

Examples of monomer (B) include itaconic anhydride, maleic anhydride, methyl maleic anhydride, ethyl maleic anhydride, dimethyl maleic anhydride or mixtures thereof. In one embodiment, monomer (B) is maleic anhydride or derivatives thereof.

Tertiary or Heterocyclic Amine

The compound containing at least one tertiary or heterocyclic amine may be a dialkylaminoalkylamine, a substituted dialkylaminoalkylamine, an aminoalkyl substituted nitrogen containing aromatic heterocycle, a dialkylaminoalkyl alcohol, a hydroxyalkyl substituted nitrogen containing aromatic heterocycle, or mixtures thereof.

In one embodiment, the compound containing at least one tertiary or heterocyclic amine may be a dialkylaminoalkylamine, a substituted dialkylaminoalkylamine, or mixtures thereof.

The dialkylaminoalkylamine may be represented by the formula $R^2(R^3)NR^4NH_2$ wherein $R^2$ and $R^3$ are independently C1-C6 alkyl moieties. $R^2$ and $R^3$ may be taken together to form a cyclic structure containing 5 to 8 carbon atoms. $R^4$ includes $C_1$ to $C_{12}$ linear or branched alkylene.

Examples of a dialkylaminoalkylamine include dimethylaminoethylamine, diethylaminopropylamine, or dimethylaminopropylamine.

The substituted dialkylaminoalkylamine may be represented by the formula $R^2(R^3)NR^4NHR^5$, wherein $R^2$, $R^3$ and $R^4$ are defined above, and $R^5$ is an optionally substituted linear or branched hydrocarbyl group.

The dialkylaminoalkyl alcohol may be represented by the formula $R^2(R^3)NR^4OH$, wherein $R^2$, $R^3$ and $R^4$ are defined previously. Examples of suitable dialkylaminoalkyl alcohols include 2-dimethylaminoethanol, 2-diethylaminoethanol, 3-dimethylamino-1-propanol, 3-diethylamino-1-propanol, 5-dimethylamino-3-methyl-1-pentanol, or mixtures thereof.

The aminoalkyl substituted nitrogen containing aromatic heterocycle may be derived from an imidazole, a pyridine a triazole, a pyrazole, a tetrazole, or mixtures thereof.

In one embodiment, aminoalkyl substituted nitrogen containing aromatic heterocycle is an imidazole. Examples of a suitable imidazole include 1-(3-aminopropyl)imidazole, 1-(3-aminobutyl)imidazole, 1-(3-aminopentyl)imidazole, 1-(3-aminohexyl)imidazole, 1-(3-aminoheptyl)imidazole, 1-(3-aminooctyl)imidazole, or mixtures thereof.

Polyetheramine

The polyetheramine may be a mono-functional polyetheramine, or mixtures thereof.

In one embodiment, the polyetheramine is a poly($C_{2-4}$-alkylene oxide), or mixtures thereof. The polyetheramine may contain less than 60%, or less than 40%, or less than 20% by weight ethylene oxide relative to the total weight of a poly ($C_{2-4}$-alkylene oxide) chain.

The alkylene moiety of the ($C_{2-4}$-alkylene oxide) group may be linear or branched. In one embodiment, the alkylene moiety is branched. The alkylene moiety may be obtained by (co)polymerisation of alkylene oxides such as ethylene oxide, propylene oxide and butylene oxide or from tetrahydrofuran. Copolymers may be random or block copolymers.

In one embodiment, the polyether chain is obtainable from propylene oxide. The polyether chain of the polyetheramine may also be obtainable from a poly($C_{2-4}$-alkylene oxide) mono-$C_{1-10}$-alkyl ether. The ($C_{2-4}$-alkylene oxide) mono-$C_{1-10}$-alkyl ether may be a methyl or butyl ether.

The number-average molecular weight of the polyetheramine may not be greater than 10,000, or not greater than 4000, or not greater than 2500. The number-average molecular weight of the polyetheramine may not be less than 300, or not less than 550, or not less than 800. In one embodiment, the polyetheramine has a number average molecular weight of 550 to 2500.

The polyetheramines used can be prepared, for example, by reductive amination of monoalkyl ethers of polyalkylene glycols.

Polyetheramines may also be obtained from reaction of a poly (alkylene oxide) monoalkyl ether with acrylonitrile and subsequent reduction with hydrogen.

Moreover, polyetheramines are obtainable by reaction of polyethers with phosgene or thionyl chloride and subsequent amination to give the polyetheramine.

A suitable source of polyetheramines is the Jeffamine™ M series of monoamines or Surfonamine™ products available from Huntsman Corporation.

The polyetheramine is reacted with the copolymer to form either amide links, imide links, or a mixture of amide and imide links.

Another Amine

In one embodiment, monomer (B) reacts with another amine. Typically, the amine is an aliphatic or aromatic primary or secondary amine containing about 1 to 20 carbon atoms. Examples of primary amines include n-butylamine, hexylamine, cyclohexylamine, n-octylamine, n-tetradecylamine, n-hexadecylamine, n-stearylamine, dehydroabietylamine, or mixtures thereof.

Alcohol

In one embodiment, monomer (B) reacts with one or more aliphatic or aromatic alcohols containing 1 to 20 carbon atoms. Examples of suitable alcohols include methanol, ethanol, n-propanol, n-butanol, n-hexanol, n-octanol, n-decanol, n-dodecanol, n-tetradecanol, n-hexadecanol, n-octadecanol, isopropanol, isobutanol, tert-butanol, 2-ethylbutanol, 2-ethylhexanol, 3-heptanol, 3,5,5-trimethylhexanol, 3,7-dimethyloctanol, or mixtures thereof.

Quaternised Amine Groups

The compound containing at least one tertiary or heterocyclic amine may be partially or wholly quaternised. Quaternising agents are known in the art. Examples of quaternising agents include alkyl halides, aralkyl halides, dialkyl carbonates, dialkyl sulphates or epoxides. In one embodiment, the quaternising agents include dimethyl sulphate, benzyl chloride, propylene oxide or styrene oxide. In one embodiment, the copolymer is quaternised, and in another embodiment the copolymer is not quaternised.

Process

The backbone of the copolymer derived from monomer (A), and monomer (B) may be prepared by techniques known in the art. A copolymer derived from (a) monomer (A), and (b) monomer (B), a dicarboxylic acid or anhydride thereof, are known. In addition, the reaction of monomer (B) with amines and alcohols are well known. U.S. Pat. No. 5,705,603 describes a general procedure for preparing a copolymer derived from (a) monomer (A), and (b) monomer (B), a dicarboxylic acid or anhydride thereof reacted with an amine.

The copolymer of the present invention may be prepared by reacting the copolymer derived from (a) monomer (A), and (b) monomer (B), a dicarboxylic acid or anhydride thereof, which contains less than 25 mol % of monomer (B), wherein at least a portion of the anhydride or dicarboxylic acid groups derived from monomer (B) are subsequently reacted with at least one amine selected from the group consisting of:

(i) a compound containing at least one tertiary or heterocyclic amine site and at least one additional group capable of reacting with dicarboxylic acid, or anhydride functional groups, and (ii) a polyetheramine.

Optionally, a portion of monomer (B) further reacts with (iii) an alcohol and/or (iv) an amine other than (i) the compound containing at least one tertiary or heterocyclic amine, and (ii) the polyetheramine.

Reaction with (i), (ii) and optional components (iii) and/or (iv) may be carried out at a temperature in the range of 20° C. to 250° C., or 60° C. to 200° C.

Typically, a reaction temperature of less than 100° C. will typically favour formation of amides. Whereas, a reaction temperature of 150° C. or greater will typically favour formation of imides.

When a portion of a primary amine from (iii) is reacted, the resultant copolymer may contain amide or imide groups.

The reactions may be carried out in the bulk or in the presence of a solvent. A solvent, if used, may be aliphatic or aromatic.

A suitable solvent may be chosen from aromatic hydrocarbons, such as toluene and xylene, aliphatic hydrocarbons, alkyl esters of alkane carboxylic acids, dialkyl ketones and dialkyl and cyclic ethers such as diethyl ether and tetrahydrofuran.

Examples of suitable solvents include alkyl esters such as methyl acetate, ethyl acetate, isopropyl acetate, butyl acetate, ethyl formate, methyl propionate, methoxy propylacetate, ethyl butyrate, or mixtures thereof.

Industrial Application

In one embodiment, the copolymer as defined above is a dispersant.

The copolymer in different embodiments is present in a composition of the invention in a range selected from 0.1 wt. % to 50 wt. %, or 0.25 wt. % to 35 wt. %, and 0.5 wt. % to 30 wt. %.

The particulate solid present in the composition may be any inorganic or organic solid material which is substantially insoluble in the organic medium. In one embodiment, the particulate solid is a pigment.

In one embodiment, the composition of the invention provides a paint or ink including a particulate solid, an organic liquid, a binder and a copolymer as described herein.

In one embodiment, the solid is an organic pigment from any of the recognised classes of pigments described, for example, in the Third Edition of the Colour Index (1971) and subsequent revisions of, and supplements thereto, under the chapter headed "Pigments". Carbon black, although strictly inorganic, behaves more like an organic pigment in its dispersing properties. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. In one embodiment, the organic pigments are phthalocyanines, especially copper phthalocyanines, monoazos, disazos, indanthrones, anthranthrones, quinacridones and carbon blacks.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids, biocides, agrochemicals and pharmaceuticals which are applied as dispersions in organic solids; particulate ceramic materials; magnetic materials and magnetic recording media; fibres such as glass, steel, carbon and boron for composite materials.

Inorganic solids include: extenders and fillers such as talc, kaolin, silica, barytes and chalk, flame-retardant fillers such as alumina trihydrate, or magnesium hydroxide; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

The organic medium present in the composition of the invention in one embodiment is a plastics material and in another embodiment an organic liquid. The organic liquid may be a non-polar or a polar organic liquid, although a polar organic liquid is typically used. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids include dialkyl ketones, alkyl esters of alkane carboxylic acids and alkanols, especially such liquids containing up to, and including, a total of 6 or 8 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxylic acids.

Examples of organic liquids, which may be used as polar organic liquids are film-forming resins such as inks, paints and chips for use in various applications such as paints and inks. Examples of such resins include polyurethanes, polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde. In one embodiment, examples of such resins include polyurethanes, polyamides, and cellulose ethers.

The organic liquid may be a polyol, that is to say, an organic liquid with two or more hydroxy groups. In one embodiment, polyols include α-omega diols or α-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid includes at least 0.1% by weight, or 1% by weight or more of a polar organic liquid based on the total organic liquid.

The organic liquid optionally further includes water. In one embodiment, the organic liquid is free of water.

When the organic liquid contains water, the amount present in one embodiment is not greater than 70%, or not greater than 50%, or not greater than 40% by weight based on the amount of organic liquid.

The plastics material may be a thermoset resin or a thermoplastic resin. The thermosetting resins useful in this invention include resins which undergo a chemical reaction when heated, catalysed, or subject to UV or electron beam radiation and become relatively infusible. Typical reactions in thermosetting resins include oxidation of unsaturated double bonds, reactions involving epoxy/amine, epoxy/carbonyl, epoxy/hydroxyl, polyisocyanate/hydroxy, amino resin/hydroxy moieties, free radical reactions or polyacrylate, cationic polymerization or epoxy resins and vinyl ether, or condensation of silanol.

Polymers with hydroxy functionality (frequently polyols) are widely used in thermosetting system to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates; and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods.

If desired, the compositions may contain other ingredients, for example, resins (where these do not already constitute the organic medium), binders, fluidising agents, anti-sedimentation agents, plasticisers, surfactants, anti-foamers, rheology modifiers, levelling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either, the organic medium or the dispersant, the other ingredient or ingredients then being added and the mixture being agitated to provide the composition.

In one embodiment, the composition of the present invention is suited to liquid dispersions. In one embodiment, such dispersion compositions comprise: (a) 0.5 to 40 parts of a particulate solid, (b) 0.5 to 30 parts of a copolymer described herein, and (c) 30 to 99 parts of an organic or aqueous medium; wherein all parts are by weight and the amounts (a)+(b)+(c)=100.

As used herein, the aqueous medium typically contains 5 wt. % to 100 wt. %, or 20 wt. % to 100%, or 50 wt. % to 100 wt. % of a polar solvent or water.

As used herein, the organic medium typically contains less than 5 wt. % or less than 2 wt. %, or less than 0.5 wt. % of water or a polar solvent.

In one embodiment, component a) includes 0.5 to 40 parts of a pigment and such dispersions are useful as liquid inks, paints and mill-bases.

If a composition is required including a particulate solid and a copolymer as described herein in dry form, the organic liquid is typically volatile so that it may be readily removed from the particulate solid by a simple separation means such as evaporation. In one embodiment, the composition includes the organic liquid.

If the dry composition consists essentially of the copolymer described herein and the particulate solid, it typically contains at least 0.2%, at least 0.5% or at least 1.0% the copolymer described herein based on weight of the particulate so lid.

As disclosed hereinbefore, the compositions of the invention are suitable for preparing mill-bases wherein the particulate solid is milled in an organic liquid in the presence of the copolymer described herein.

Thus, according to a still further embodiment of the invention, there is provided a mill-base including a particulate solid, an organic liquid and the copolymer described herein.

Typically, the mill-base contains from 20% to 70% by weight particulate solid based on the total weight of the mill-base. In one embodiment, the particulate solid is not less than 10%, or not less than 20% by weight of the mill-base. Such mill-bases may optionally contain a binder added either before or after milling. The binder is a polymeric material capable of binding the composition on volatilisation of the organic liquid.

Binders are polymeric materials including natural and synthetic materials. In one embodiment, binders include poly (meth)acrylates, polystyrenics, polyesters, polyurethanes, alkyds, polysaccharides such as cellulose, and natural proteins such as casein. In one embodiment, the binder is present in the composition at more than 100 wt. % based on the amount of particulate solid, more than 200 wt. %, more than 300 wt. % or more than 400 wt. %.

The amount of optional binder in the mill-base can vary over wide limits but is typically not less than 10%, and often not less than 20% by weight of the continuous/liquid phase of the mill-base. In one embodiment, the amount of binder is not greater than 50%, or not greater than 40% by weight of the continuous/liquid phase of the mill-base.

The amount of dispersant in the mill-base is dependent on the amount of particulate solid but is typically from 0.5% to 5% by weight of the mill-base.

Dispersions and mill-bases made from the composition of the invention are particularly suitable for use in coatings and paints both solvent-based and water-base, especially high solids paints; inks, especially offset, flexographic, gravure, radiation-curable, and screen inks; non-aqueous ceramic processes, especially tape-coating, doctor-blade, extrusion and injection moulding type processes, composites, cosmetics, adhesives and plastics materials.

In one embodiment, the composition of the invention further includes one or more additional known dispersants.

The following examples provide illustrations of the invention. These examples are non exhaustive and are not intended to limit the scope of the invention.

EXAMPLES

Comparative Examples A-D:
Sartomer SMA EF40 or Sartomer SMA EF60 (both generically a styrene maleic anhydride copolymer supplied by Sartomer) and ethyl acetate are charged into a 250 cm$^3$ 4-neck round bottom flask, fitted with condenser, mechanical stirrer, thermocouple, nitrogen inlet and dropping funnel. After the SMA dissolves, Jeffamine™ M2005 (a polyetheramine commercially available from Huntsman) is added over a period of 10 minutes at room temperature whilst stirring under a blanket of nitrogen. A small exotherm is observed. The flask is then heated and stirred at 80° C. for a minimum of 6 hours. In each case, the product obtained is a clear yellow solution. The quantities of reagents used in each comparative example are as detailed in the following table:

TABLE 1

| Comparative Example | Sartomer SMA grade | Parts by weight SMA | Parts by weight ethyl acetate | Parts by weight Jeffamine M2005 | Time heated at 80° C. | Solids content of product solution/wt. % |
| --- | --- | --- | --- | --- | --- | --- |
| A | EF40 | 30.0 | 127.5 | 54.9 | 6 | 40.7 |
| B | EF40 | 25.0 | 133.6 | 64.1 | 6 | 44.3 |
| C | EF60 | 40.0 | 130.0 | 58.05 | 13 | 45.6 |
| D | EF60 | 25 | 130.0 | 61.67 | 6 | 43.6 |

Example 1

Comparative Example A (50 parts of 40.7 wt. % solution in ethyl acetate) is charged into a 100 cm$^3$ 3-neck round bottom flask fitted with condenser, mechanical stirrer, thermocouple and nitrogen inlet. 1.34 parts of a 10 wt. % solution of DMAPA (3-dimethylamino-1-propylamine) in ethyl acetate is added to the flask and the resulting solution is stirred at 80° C. under nitrogen for a total of 15 hours. The product obtained is a clear yellow solution with solids content 45.5 wt. %.

Example 2

Comparative Example A (50 parts of 40.7 wt. % solution in ethyl acetate) is charged into a 100 cm$^3$ 3-neck round bottom flask fitted with condenser, mechanical stirrer, thermocouple and nitrogen inlet. 3.36 parts of a 10 wt. % solution of DMAPA in ethyl acetate is added to the flask and the resulting solution was stirred at 80° C. under nitrogen for a total of 13 hours. The product obtained is a clear yellow solution with solids content 45.3 wt. %.

Example 3

Comparative Example A (50 parts of 40.7 wt. % solution in ethyl acetate) is charged into a 100 cm$^3$ 3-neck round bottom flask fitted with condenser, mechanical stirrer, thermocouple and nitrogen inlet. DMAPA (0.673 parts) is added to the flask and the resulting solution was stirred at 80° C. under nitrogen for a total of 13 hours. The product obtained is a clear yellow solution with solids content 41.8 wt. %.

Example 4

Comparative Example B (50 parts of 44.3 wt. % solution in ethyl acetate) is charged into a 100 cm$^3$ 3-neck round bottom flask fitted with condenser, mechanical stirrer, thermocouple and nitrogen inlet. A solution of DMAPA (0.116 parts) in ethyl acetate (1.0 parts) is added and the resulting solution was stirred at 80° C. under nitrogen for a total of 15 hours. The product obtained as a clear yellow solution with solids content 48.9 wt. %.

Example 5

Comparative Example B (50 parts of 44.3 wt. % solution in ethyl acetate) is charged into a 100 cm$^3$ 3-neck round bottom flask fitted with condenser, mechanical stirrer, thermocouple and nitrogen inlet. 2.9 parts of 10 wt. % solution of DMAPA in ethyl acetate is added and the resulting solution was stirred at 80° C. under nitrogen for a total of 15 hours. The product obtained is a clear yellow solution with solids content 48.9 wt. %.

Example 6

Comparative Example C (50 parts of 40.6 wt. % solution in ethyl acetate) is charged into a 100 cm$^3$ 3-neck round bottom flask fitted with condenser, mechanical stirrer, thermocouple and nitrogen inlet. 1.23 parts of 10 wt. % solution of DMAPA in ethyl acetate is added and the resulting solution was stirred at 80° C. under nitrogen for a total of 13 hours. The product obtained is a clear yellow solution with solids content 43.2 wt. %.

Example 7

Comparative Example C (50 parts of 40.6 wt. % solution in ethyl acetate) is charged into a 100 cm$^3$ 3-neck round bottom flask fitted with condenser, mechanical stirrer, thermocouple and nitrogen inlet. 3.065 parts of 10 wt. % solution of DMAPA in ethyl acetate is added and the resulting solution was stirred at 80° C. under nitrogen for a total of 13 hours. The product obtained is a clear yellow solution with solids content 42.2 wt. %.

Example 8

Comparative Example C (50 parts of 40.6 wt. % solution in ethyl acetate) is charged into a 100 cm$^3$ 3-neck round bottom flask fitted with condenser, mechanical stirrer, thermocouple and nitrogen inlet. DMAPA (0.613 parts) is added to the flask and the resulting solution was stirred at 80° C. under nitrogen for a total of 14 hours. The product obtained is a clear yellow solution with solids content of 41.8 wt. %.

Example 9

Comparative Example D (50 parts of 43.6 wt. % solution in ethyl acetate) is charged into a 100 cm$^3$ 3-neck round bottom flask fitted with condenser, mechanical stirrer, thermocouple and nitrogen inlet. 0.932 parts of 10 wt. % solution of DMAPA in ethyl acetate is added and the resulting solution is stirred at 80° C. under nitrogen for a total of 15 hours. The product obtained is a clear yellow solution with solids content 52.9 wt. %.

Example 10

Sartomer SMA 2000 (25.0 parts) is dissolved in ethyl acetate (159.8 parts) in a 250 cm$^3$ 4-neck round bottom flask, fitted with condenser, mechanical stirrer, thermocouple, nitrogen inlet and dropping funnel. Jeffamine M2005 (81.5 parts) is added over a period of 30 minutes at room temperature whilst stirring under a blanket of nitrogen. A small exotherm is observed. After standing overnight the reaction mixture is heated and stirred at 60° C. for 3 hours resulting in a clear yellow solution with solids content 43.7 wt. %. 50 parts of this solution is transferred to another flask. A solution of DMAPA in ethyl acetate (25 wt. % active, 0.68 parts) is added to the solution. The resulting solution is stirred at 80° C. under nitrogen for a total of 15 hours. The product obtained is a clear yellow solution with solids content 43.6 wt. %.

Example 11 is prepared in the same manner as Example 4 using the same reagents and relative quantities. The product obtained as a clear yellow solution with solids content 45.6 wt. %.

Example 12

100 parts of the solution of comparative Example E is added to a 250 cm$^3$ 4-neck round bottom flask fitted with condenser, mechanical stirrer, thermocouple and nitrogen inlet. A solution of DMAPA (0.543 parts) in ethyl acetate (5.0 parts) is added and the resulting solution is stirred at 80° C. under nitrogen for a total of 15 hours. The solution is cooled to ambient. Benzyl chloride (0.673 parts) is added to the reaction vessel and the mixture heated to 80° C. for 12 hours. The quaternised product has a solids content of 42.5 wt. %.

Example 13

100 parts of the solution of comparative Example E is added to a 250 cm$^3$ 4-neck round bottom flask fitted with condenser, mechanical stirrer, thermocouple and nitrogen inlet. A solution of 3-aminopropyl imidazole (0.266 parts) in ethyl acetate (0.264 parts) is added and the resulting solution is stirred at 80° C. under nitrogen for a total of 21 hours. The product obtained is a clear yellow solution with solids content 43.5 wt. %.

Example 14

Sartomer SMA EF40 (25.0 parts) and Jeffamine M2005 (64.1 parts) are charged into a 3-neck round bottom flask, fitted with mechanical stirrer, thermocouple and nitrogen inlet to form a mixture. The mixture is heated with stirring under a nitrogen atmosphere to 110° C. and held until the Sartomer SMA EF40 dissolves. The temperature is raised to 180° C. and maintained for 18 hours. The contents of the flask are then cooled 70° C. and DMAPA (0.468 parts) is added. The mixture is reheated to 180° C. and temperature maintained for a further 11 hours. The product obtained is a highly viscous orange liquid.

Black Pigment Dispersions:

Black mill-bases are prepared by adding the materials detailed in the following table to a 125 cm$^3$ glass jar in the order listed. The pigment loading is 25 parts and the active content of the dispersant is 25 wt. % based on the mass of pigment used. The mill-bases further contain 12.5 parts of Elftex®415 (a black pigment commercially available from Cabot Corporation), 1.7 parts of Laropal® K80 (a ketone resin commercially available from BASF), and 26.9 parts of ethanol. The table below indicates the amount ethyl acetate and dispersant present.

TABLE 2

| | | | | | | | | | | | | | | |
|---|---|---|---|---|---|---|---|---|---|---|---|---|---|---|
| | Millbase Reference | | | | | | | | | | | | | |
| Dispersant Example | Comp. K-A | K-1 | K-2 | K-3 | Comp. K-B | K-4 | K-5 | Comp. K-C | K-6 | K-7 | K-8 | Comp. K-D | K-9 | K-10 |
| A | 7.62 | | | | | | | | | | | | | |
| 1 | | 7.10 | | | | | | | | | | | | |
| 2 | | | 6.94 | | | | | | | | | | | |
| 3 | | | | 7.44 | | | | | | | | | | |
| B | | | | | 7.10 | | | | | | | | | |
| 4 | | | | | | 6.37 | | | | | | | | |
| 5 | | | | | | | 6.37 | | | | | | | |
| C | | | | | | | | 7.62 | | | | | | |
| 6 | | | | | | | | | 7.26 | | | | | |
| 7 | | | | | | | | | | 7.44 | | | | |
| 8 | | | | | | | | | | | 7.44 | | | |
| D | | | | | | | | | | | | 7.10 | | |
| 9 | | | | | | | | | | | | | 5.90 | |
| 10 | | | | | | | | | | | | | | 7.16 |
| Ethyl acetate | 0.88 | 1.40 | 1.56 | 1.06 | 1.40 | 2.13 | 2.13 | 0.88 | 1.24 | 1.06 | 1.06 | 1.40 | 2.60 | 1.34 |

In each case, the mixture is gently stirred to wet out the pigment. 125 parts of 3 mm diameter glass beads are added to the jar. The jar is placed in a Scandex disperser model 200-K and the contents milled by oscillatory shaking for 2 hours.

A 19.6 wt. % active nitrocellulose solution is prepared by mixing together 126 parts of nitrocellulose DLX™ 5-10 (70 wt. % active in isopropanol, and commercially available from Nobel Enterprises) 189 parts ethanol, and 135 parts ethyl acetate. A nitrocellulose based ink formulation is prepared by adding 1.5 parts of a mill-base described above to the nitrocellulose solution.

The resulting ink formulations are drawn down onto Leneta black and white card using an automatic film applicator fitted with a number 2 K bar. The coatings are allowed to air dry. Gloss and Haze of the coatings are measured using a Byk Gardner 4600 Haze-gloss meter. Jetness of the coating is visually assessed under standard D65 illumination. A drawdown prepared from a control formulation is given an arbitrary jetness rating of 3. The drawdowns prepared from the inks are rated relative to the control on a scale of 1 to 5 (1=high jetness, 5=low jetness). The results are detailed in the table below:

TABLE 3

| Ink from Mill-base Composition | Gloss 60° | Gloss 20° | HAZE | D65 Jetness |
|---|---|---|---|---|
| Control Formulation | 85.2 | 37.2 | 405 | 3 |
| K-A | 74.0 | 27.4 | 339 | 4 |
| K-1 | 101.0 | 51.9 | 483 | 1 |
| K-2 | 101.0 | 48.7 | 511 | 1 |
| K-3 | 98.4 | 48.3 | 470 | 1-2 |
| K-B | 70.0 | 21.7 | 335 | 5 |
| K-4 | 104.0 | 52.9 | 492 | 1 |
| K-5 | 108.0 | 61.6 | 506 | 1 |
| K-C | 51.7 | 11.1 | 229 | 5 |
| K-6 | 98.2 | 48.0 | 466 | 1-2 |
| K-7 | 101.0 | 51.4 | 481 | 1-2 |
| K-8 | 99.0 | 48.1 | 489 | 2-3 |
| K-D | 48.5 | 9.5 | 199 | 5 |
| K-9 | 101.0 | 50.2 | 483 | 1-2 |
| K-10 | 51.7 | 7.2 | 142 | 5 |

Blue Pigment Dispersions

Blue dispersions were prepared by adding the materials detailed in the following table to a 125 cm³ glass jar in the order listed.

TABLE 4

| | Millbase Reference | | | |
|---|---|---|---|---|
| | Control | Blue comp. E | Blue 11 | Blue 12 |
| Irgalite Blue GLVO[e] | 8.80 | 12.00 | 12.00 | 12.00 |
| Dispersant comparative example E | | 2.89 | | |
| Dispersant example 11 | | | 2.63 | |
| Dispersant example 12 | | | | 2.82 |
| Solution of nitrocellulose DLX 3-5[d] diluted to 20 wt. % active with ethanol. | 26.00 | | | |
| Ethanol | 5.20 | 25.11 | 25.37 | 25.18 |

Footnote
[d]DLX 3-5 supplied by Nobel Enterprises as 70 wt. % active damped with isopropanol.
[e]Copper phthalocyanine pigment supplied by Ciba In each case, the mixture is gently stirred to wet out the pigment. 125 parts of 3 mm diameter glass beads were added to the jar. The jar is placed in a Scandex disperser model 200-K and the contents milled by oscillatory shaking for 30 minutes.

Blue Nitrocellulose (NC) Ink

Nitrocellulose DLX 3-5 is diluted to 36 wt. % active by addition of ethanol and ethyl acetate in a weight ratio of 3:1. Blue nitrocellulose inks are prepared by mixing the components as shown in the table.

TABLE 5

| | Ink Composition (parts by weight) | | | |
|---|---|---|---|---|
| | NC Control | NC Comparative E | NC Ink 11 | NC Ink 12 |
| Millbase Blue control | 6.50 | | | |
| Millbase Blue comp. E | | 2.38 | | |
| Millbase Blue 11 | | | 2.38 | |
| Millbase Blue 12 | | | | 2.38 |
| Nitrocellulose DLX 3-5 % 36 wt. active solution | 2.43 | 2.40 | 2.40 | 2.40 |
| Ethanol/ethyl acetate blend (3/1 wt./wt.) | 1.07 | 0.22 | 0.22 | 0.22 |

Blue Polyurethane (PU) Ink

NeoRez U-395 (supplied by NeoResins as 45 wt. % active solution in ethanol/ethyl acetate) is diluted to a 36 wt. % active solution by addition of ethyl acetate. Blue polyurethane inks are prepared by mixing the components as shown in the table.

TABLE 6

|  | Ink Composition (parts by weight) | | | |
|---|---|---|---|---|
|  | PU Control | PU Comparative E | PU Ink 11 | PU Ink 12 |
| Millbase Blue control | 6.50 | | | |
| Millbase Blue comp. E | | 2.38 | | |
| Millbase Blue 11 | | | 2.38 | |
| Millbase Blue 12 | | | | 2.38 |
| NeoRez U-395 36 wt. % active solution | 2.43 | 2.40 | 2.40 | 2.40 |
| Ethanol/ethyl acetate blend (3/1 wt./wt.) | 1.07 | 0.22 | 0.22 | 0.22 |

Blue Polyamide (PA) Ink

UNI-REZ 126 (supplied by Arizona Chemical) is diluted to a 36 wt. % active solution by addition of a blend of ethanol/ethyl acetate in weight ratio of 3/1. Blue polyamide inks are prepared by mixing the components as shown in the table.

TABLE 7

|  | Ink Composition (parts by weight) | | | |
|---|---|---|---|---|
|  | PA Control | PA Comparative E | PA Ink 11 | PA Ink 12 |
| Millbase Blue control | 6.50 | | | |
| Millbase Blue comp. E | | 2.38 | | |
| Millbase Blue 11 | | | 2.38 | |
| Millbase Blue 12 | | | | 2.38 |
| UNI-REZ 126 36 wt. % active solution | 2.43 | 2.40 | 2.40 | 2.40 |
| Ethanol/ethyl acetate blend (3/1 wt./wt.) | 1.07 | 0.22 | 0.22 | 0.22 |

The blue ink formulations are drawn down onto Leneta black and white card using an automatic film applicator fitted with a number 2 K bar. The coatings are allowed to air dry. Gloss and Haze of the coatings are measured using a Byk Gardner 4600 Haze-gloss meter. Colouristic properties are visually assessed under standard D65 illumination. A drawdown prepared from a control formulation is assigned an arbitrary value of 0 for both colour intensity and transparency. The drawdowns prepared from the other inks are assessed relative to the control. For intensity positive numbers indicate stronger colour, negative numbers weaker colour. For transparency positive numbers indicate more transparent, negative numbers more opaque. The results are shown in the following tables.

TABLE 8

| Nitrocellulose Inks | | | | | |
|---|---|---|---|---|---|
|  | Gloss 60° | Gloss 20° | HAZE | visual intensity | visual transparency |
| NC Control | 70.3 | 37.5 | 230 | 0 | 0 |
| NC Comparative E | 68.1 | 29.2 | 150 | −2 | −4 |
| NC Ink 11 | 82.3 | 46.0 | 209 | +1-2 | +2 to +3 |
| NC Ink 12 | 82.3 | 46.1 | 224 | +2 | +3 to +4 |

TABLE 9

| Polyurethane Inks | | | | | |
|---|---|---|---|---|---|
|  | Gloss 60° | Gloss 20° | HAZE | visual intensity | visual transparency |
| PU Control | 67.4 | 33.7 | 260 | 0 CTRL | 0 |
| PU Comparative E | 58.6 | 18.5 | 127 | −3 | −3 |
| PU Ink 11 | 75.7 | 39.9 | 158 | +2-3 | +4 |
| PU Ink 12 | 79.8 | 47.3 | 193 | +4 | +6 |

TABLE 10

| Polyamide Inks | | | | | |
|---|---|---|---|---|---|
|  | Gloss 60° | Gloss 20° | HAZE | visual intensity | visual transparency |
| PA Control | 54.7 | 14.9 | 252 | 0 CTRL | 0 |
| PA Comparative E | 73.4 | 32.3 | 287 | +6 | +5 |
| PA Ink 11 | 75.1 | 36.1 | 295 | +8 | +6 |
| PA Ink 12 | 79.2 | 41.4 | 302 | +8 | +5 to +6 |

The data obtained from the tests indicates that the dispersants of the invention enable inks to be prepared in a range of polymeric binders producing good tinctorial properties.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A paint or ink composition comprising a particulate solid, wherein the particulate solid is a pigment, an organic medium, and a dispersant copolymer having a number average molecular weight of 1000 to 50,000 derived from (a) 85 mol % to 99.9 mol % of monomer (A) comprising an α-olefin or vinyl aromatic monomer or mixtures thereof, and (b) 0.1 to 15 mol % of monomer (B) comprising a dicarboxylic acid or anhydride thereof, wherein said copolymer has anhydride or dicarboxylic acid groups derived from monomer (B), wherein at least a portion of the anhydride or dicarboxylic acid groups derived from monomer (B) are subsequently to forming said copolymer reacted with:

(i) a compound containing at least one tertiary or heterocyclic amine and at least one additional group capable of reacting with dicarboxylic acid, or anhydride functional groups, wherein at least 10% of the monomer (B) groups react with said compound containing the at least one tertiary or heterocyclic amine and (ii) a monofunctional polyetheramine, wherein at least 10% of the monomer (B) groups are reacted with said polyetheramine.

2. The paint or ink composition of claim 1, wherein the copolymer is derived from an α-olefin and maleic anhydride.

3. The paint or ink composition of claim 1, wherein the copolymer is derived from a vinyl aromatic monomer and maleic anhydride.

4. The paint or ink composition of claim 1, wherein the compound containing at least one tertiary or heterocyclic amine is selected from the group consisting of a dialkylaminoalkylamine, an aminoalkyl substituted nitrogen containing aromatic heterocycle, a dialkylaminoalkyl alcohol, a hydroxyalkyl substituted nitrogen containing aromatic heterocycle, and mixtures thereof.

5. The paint or ink composition of claim 1, wherein the compound containing at least one tertiary or heterocyclic amine is a dialkylaminoalkylamine.

6. The paint or ink composition of claim 5, wherein the dialkylaminoalkylamine is dimethylaminoethylamine, diethylaminopropylamine, or dimethylaminopropylamine.

7. The paint or ink composition of claim 1, wherein the polyether chain of said polyetheramine is a poly($C_{2-4}$-alkylene oxide) chain.

8. The paint or ink composition of claim 7, wherein the polyetheramine contains less than 60% by weight of ethylene oxide relative to the total weight of the poly ($C_{2-4}$-alkylene oxide) chain.

9. The paint or ink composition of claim 1, wherein the copolymer is quaternised.

10. The paint or ink composition of claim 1, wherein the compound containing at least one tertiary or heterocyclic amine reacts with up to 70% of monomer (B) groups of the copolymer.

11. The paint or ink composition of claim 1, wherein the compound containing at least one tertiary or heterocyclic amine reacts with up to 35% of monomer (B) groups of the copolymer.

12. The paint or ink composition of claim 1, wherein the polyetheramine reacts with at least 30% of monomer (B) groups of the copolymer.

* * * * *